United States Patent
Wong et al.

(10) Patent No.: US 10,570,254 B2
(45) Date of Patent: Feb. 25, 2020

(54) PREPARATION METHOD OF POLYURETHANE RESIN

(71) Applicants: National Tsing Hua University, Hsinchu (TW); Chang Chun Plastics Co., Ltd., Taipei (TW); Chang Chun Petrochemical Co., Ltd., Taipei (TW)

(72) Inventors: David S. H. Wong, Hsinchu (TW); Kan-Nan Chan, Taipei (TW); Ping-Lin Yang, Hsinchu (TW); An-Pang Tu, Taipei (TW); En-Ko Lee, Hsinchu (TW)

(73) Assignees: National Tsing Hua University, Hsinchu (TW); Chang Chun Plastics Co., Ltd., Taipei (TW); Chang Chun Petrochemical Co., Ltd., Taipei (TW)

( * ) Notice: Subject to any disclaimer, the term of this patent is extended or adjusted under 35 U.S.C. 154(b) by 106 days.

(21) Appl. No.: 15/798,401

(22) Filed: Oct. 31, 2017

(65) Prior Publication Data
US 2019/0077912 A1     Mar. 14, 2019

(30) Foreign Application Priority Data
Sep. 8, 2017    (TW) .............................. 106130719 A

(51) Int. Cl.
*C08G 71/04*    (2006.01)
*B01J 8/08*    (2006.01)
(Continued)

(52) U.S. Cl.
CPC .............. *C08G 71/04* (2013.01); *B01J 8/087* (2013.01); *B01J 8/1836* (2013.01); *B01J 8/20* (2013.01);
(Continued)

(58) Field of Classification Search
CPC ......... C08G 71/04; B01J 8/087; B01J 8/1836; B01J 2208/00442; B01J 8/20; B01J 8/42;
(Continued)

(56) References Cited

U.S. PATENT DOCUMENTS 5,471,037 A * 11/1995 Goethel ................. B01J 19/126
                                                                 204/157.43
8,450,413 B2    5/2013 Diakoumakos et al.

FOREIGN PATENT DOCUMENTS

CN    1867612    11/2006
CN    1880360    12/2006
(Continued)

OTHER PUBLICATIONS

Raymond J. Giguere et al., "Application of commerical microwave ovens to organic synthesis," Tetrahedron Letters, vol. 27, No. 41, May 1986, pp. 4945-4948.
(Continued)

*Primary Examiner* — Shane Fang
(74) *Attorney, Agent, or Firm* — JCIPRNET

(57) ABSTRACT

A preparation method of a polyurethane resin including the following steps is provided. A liquid polyamine compound is placed in a continuous reaction system, and the liquid polyamine compound is circulated in the continuous reaction system. A solid bis(cyclic carbonate) and a solid catalyst are placed in the continuous reaction system to mix the solid bis(cyclic carbonate), solid catalyst, and liquid polyamine compound to form a heterogeneous mixture. The heterogeneous mixture is heated in the continuous reaction system in a microwave manner, such that the heterogeneous mixture reacts to form a polyurethane resin.

9 Claims, 2 Drawing Sheets

(51) Int. Cl.
*B01J 8/18* (2006.01)
*B01J 19/12* (2006.01)
*B01J 8/42* (2006.01)
*B01J 8/20* (2006.01)

(52) U.S. Cl.
CPC .............. *B01J 8/42* (2013.01); *B01J 19/126* (2013.01); *B01J 2208/00442* (2013.01); *B01J 2219/089* (2013.01); *B01J 2219/0892* (2013.01); *B01J 2219/1215* (2013.01); *B01J 2219/1227* (2013.01); *B01J 2219/1284* (2013.01); *B01J 2219/1296* (2013.01)

(58) Field of Classification Search
CPC .............. B01J 19/126; B01J 2219/089; B01J 2219/0892; B01J 2219/1227; B01J 2219/1284; B01J 2219/1296; B01J 2219/1215
See application file for complete search history.

(56) References Cited

FOREIGN PATENT DOCUMENTS

| CN | 101775137 | 7/2010 |
|---|---|---|
| CN | 104725633 | 6/2015 |
| CN | 105504272 | 4/2016 |
| TW | I422607 | 1/2014 |

OTHER PUBLICATIONS

Richard Gedye et al., "The use of microwave ovens for rapid organic synthesis," Tetrahedron Letters, vol. 27, No. 3, 1986, pp. 279-282.
Yushang Luo et al., "Advances in Microwave on Chemical Reactions," Hans Journal of Chemical Engineering and Technology, Jul. 2014, pp. 45-62.
Pelle Lidstrom et al., "Microwave assisted organic synthesis—a review," Tetrahedron, Aug. 2001, pp. 9225-9283.
Mark C. Bagley et al., "A Simple Continuous Flow Microwave Reactor," J. Org. Chem., vol. 70, Aug. 2005, pp. 7003-7006.
R. Correa et al., "Emulsion polymerization in a microwave Reactor," Polymer, vol. 39, No. 6-7, 1998, pp. 1471-1474.
Teresa Cablewski et al., "Development and Application od a Continuous Microwave Reactor for Organic Synthesis," J. Org. Chem., vol. 59, Jun. 1994, pp. 3408-3412.
Jing-Zhong Hwang et al., "Green PU resin from an accelerated Non-isocyanate process with microwave radiation," J. Polym Res., vol. 20, Jun. 2013, pp. 1-10.
"Office Action of China Counterpart Application", dated Oct. 4, 2018, p. 1-p. 8.

\* cited by examiner

PREPARATION METHOD OF POLYURETHANE RESIN

CROSS-REFERENCE TO RELATED APPLICATION

This application claims the priority benefit of Taiwan application serial no. 106130719, filed on Sep. 8, 2017. The entirety of the above-mentioned patent application is hereby incorporated by reference herein and made a part of this specification.

BACKGROUND OF THE INVENTION

Field of the Invention

The invention relates to a preparation method of a polymer, and more particularly, to a preparation method of a polyurethane resin.

Description of Related Art

The polyurethane resin is extensively applied in the industry, and application products thereof include, for instance, adhesives, coatings, tires, washers, and car mats. The current polyurethane resin is mostly synthesized by using isocyanate as the raw material, and based on environmental protection considerations, a raw material of non-isocyanate polymerizing into polyurethane has started to be developed. However, for the polyurethane resin synthesized by non-isocyanate, preparing a polyurethane resin via a general heating method (such as steam heating or water heating) is relatively time and energy consuming. Therefore, the preparation cost of the polyurethane resin is significantly increased.

SUMMARY OF THE INVENTION

The invention provides a preparation method of a polyurethane resin that can lower preparation cost.

The preparation method of the polyurethane resin of the invention includes the following steps. A liquid polyamine compound is placed in a continuous reaction system, and the liquid polyamine compound is circulated in the continuous reaction system. A solid bis(cyclic carbonate) and a solid catalyst are placed in the continuous reaction system to mix the solid bis(cyclic carbonate), the solid catalyst, and the liquid polyamine compound to form a heterogeneous mixture. The heterogeneous mixture is heated in the continuous reaction system in a microwave manner, such that the heterogeneous mixture reacts to form a polyurethane resin.

In an embodiment of the invention, the continuous reaction system includes a collection tank and a microwave reactor. The collection tank is used to house the liquid polyamine compound, the solid bis(cyclic carbonate), and the solid catalyst. The microwave reactor includes a reaction chamber and at least one magnetron. The reaction chamber has an inlet and an outlet. The inlet and the outlet are respectively coupled to the collection tank. The heterogeneous mixture receives a microwave generated by the at least one magnetron in the reaction chamber to be heated.

In an embodiment of the invention, the continuous reaction system further includes a first release port located between the outlet of the reaction chamber and the collection tank to remove the polyurethane resin from the first release port.

In an embodiment of the invention, the continuous reaction system further includes a controller. The controller is coupled to the at least one magnetron. The controller is used to control the switch and output power of each of the magnetrons.

In an embodiment of the invention, the continuous reaction system further includes a pump. The pump is disposed between the collection tank and the inlet of the reaction chamber to feed the heterogeneous mixture into the reaction chamber.

In an embodiment of the invention, the continuous reaction system further includes a second release port located between the pump and the collection tank to remove the polyurethane resin from the second release port.

In an embodiment of the invention, the liquid polyamine compound includes an aliphatic diamine compound, an aromatic diamine compound, a polysiloxane diamine compound, or a combination thereof.

In an embodiment of the invention, the solid bis(cyclic carbonate) includes a bisphenol A-type pentacyclic carbonate resin, a soybean pentacyclic carbonate resin, or a combination thereof.

In an embodiment of the invention, the solid catalyst includes a metal halide.

In an embodiment of the invention, the reaction temperature range of the heterogeneous mixture in the continuous reaction system is 100° C. to 150° C.

Based on the above, in an embodiment of the invention, the liquid polyamine compound, solid bis(cyclic carbonate), and solid catalyst are heated in a continuous reaction system in a microwave manner to prepare a polyurethane resin. Since microwave heating transfers energy in a radiation manner, heat loss caused by thermal convection can be prevented. As a result, the conversion rate of the reaction can be increased, and energy consumption needed to prepare the polyurethane resin can be reduced. Moreover, by preparing the polyurethane resin via a continuous reaction system, the yield of preparing polyurethane can be increased.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
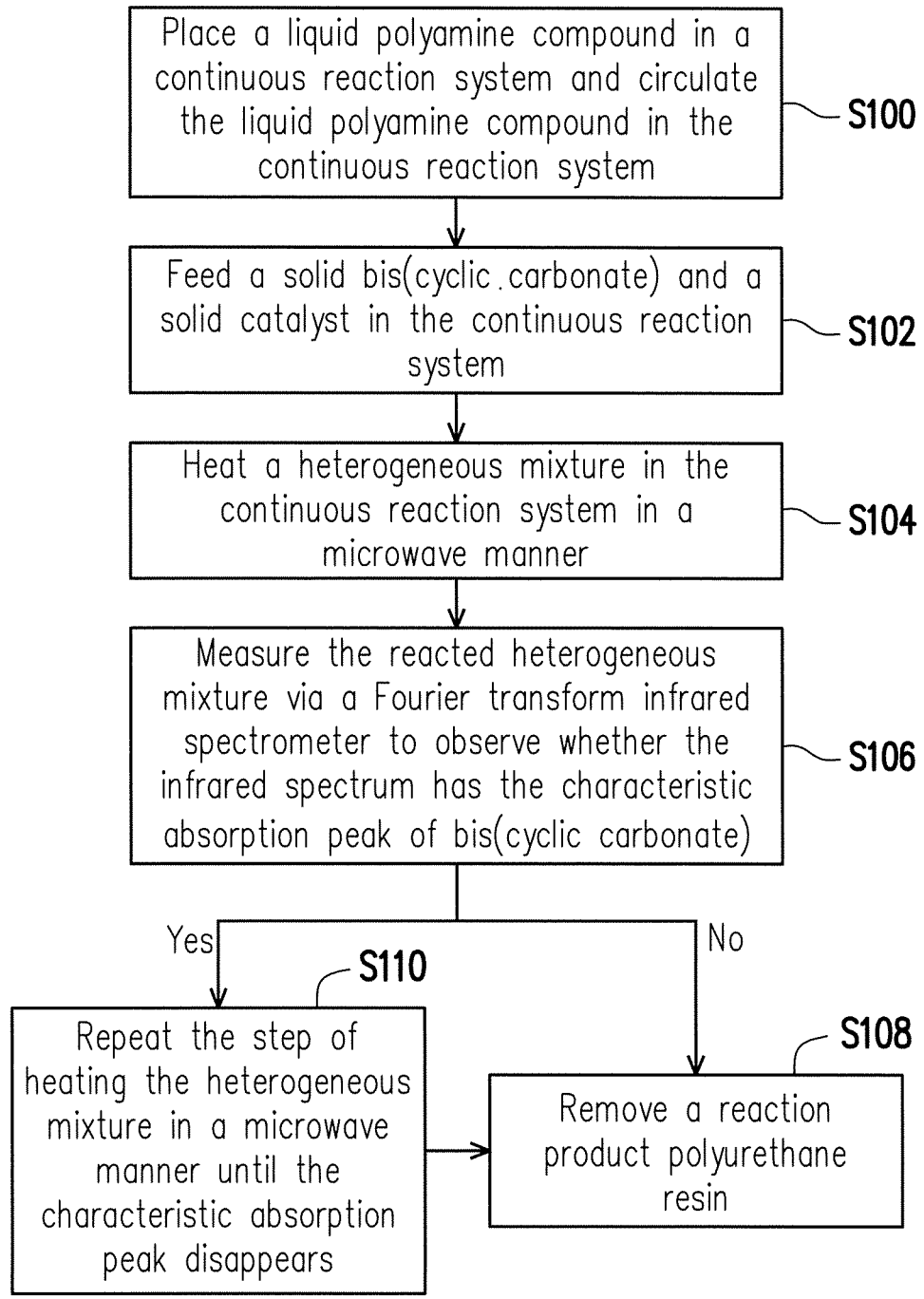
FIG. 1 is a flow chart of a preparation method of a polyurethane resin according to an embodiment of the invention.
Figure 2:
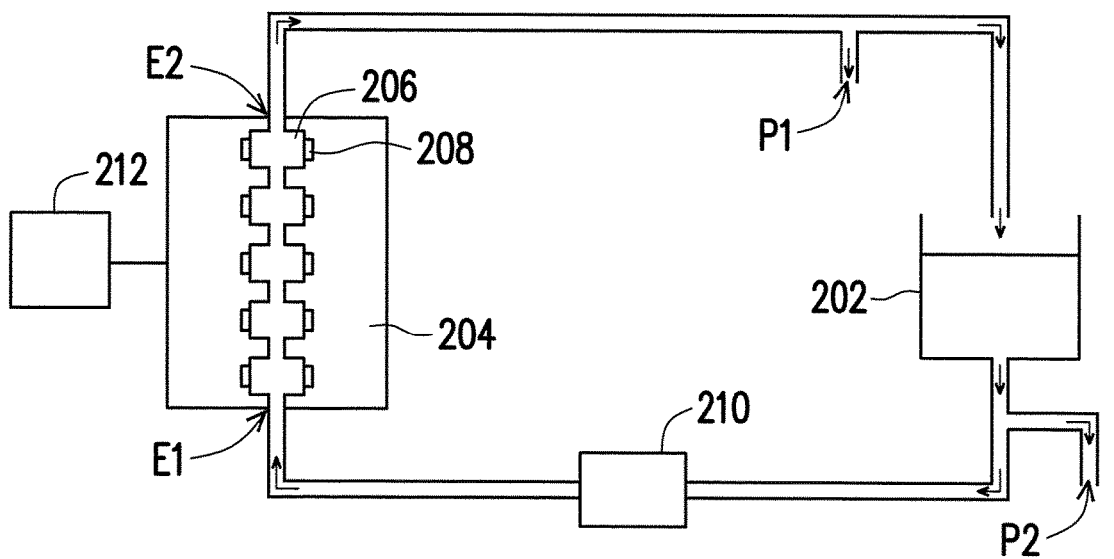
FIG. 2 is a schematic of a continuous reaction system for preparing a polyurethane resin according to an embodiment of the invention.
Figure 3:
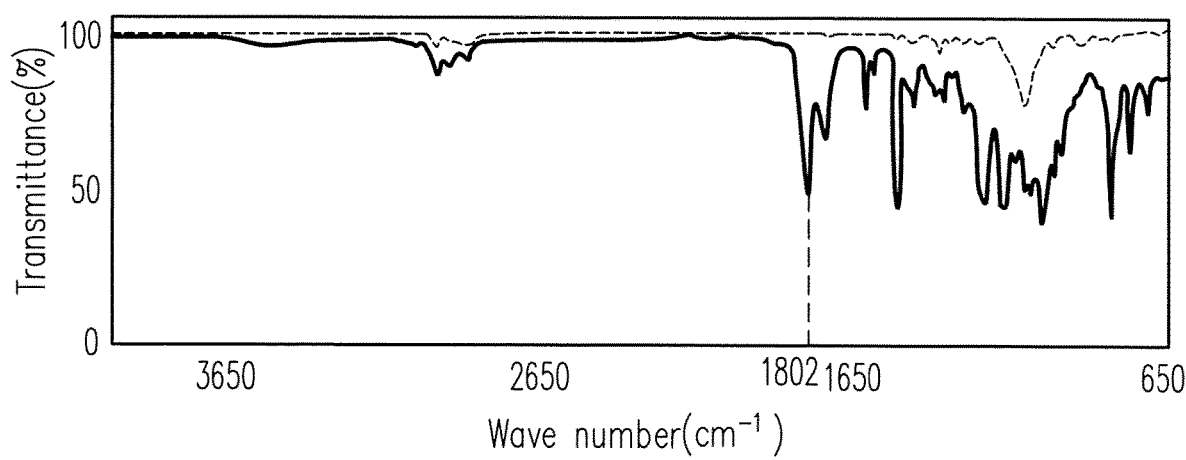
FIG. 3 is an infrared spectrum of a bis(cyclic carbonate) and a reacted heterogeneous mixture according to an embodiment of the invention.

FIG. 1 is a flow chart of a preparation method of a polyurethane resin according to an embodiment of the invention. FIG. 2 is a schematic of a continuous reaction system 200 for preparing a polyurethane resin according to an embodiment of the invention. FIG. 3 is an infrared spectrum of a bis(cyclic carbonate) and a reacted heterogeneous mixture according to an embodiment of the invention.

Referring to FIG. 1 and FIG. 2, the preparation method of a polyurethane resin of an embodiment of the invention includes the following steps.

Step S100 is performed to place a liquid polyamine compound in the continuous reaction system 200, and the liquid polyamine compound is circulated in the continuous reaction system 200. In some embodiments, the polyamine compound includes an aliphatic diamine compound, an aromatic diamine compound, a polysiloxane diamine compound, or a combination thereof.

Step S102 is performed to place a solid bis(cyclic carbonate) and a solid catalyst in the continuous reaction system 200. As a result, the solid bis(cyclic carbonate) and the solid catalyst can be mixed with the liquid polyamine compound circulated in the continuous reaction system 200 beforehand to form a heterogeneous mixture. In some embodiments, the solid bis(cyclic carbonate) includes a bisphenol A-type pentacyclic carbonate resin, a soybean pentacyclic carbonate resin, or a combination thereof. Moreover, the solid catalyst can include a metal halide. For instance, the solid catalyst can be lithium bromide.

Step S104 is performed to heat the heterogeneous mixture in the continuous reaction system 200 in a microwave manner. As a result, the solid bis(cyclic carbonate) and the liquid polyamine compound in the heterogeneous mixture can be reacted in an environment including a solid catalyst to form a polyurethane resin product. In some embodiments, the continuous reaction system 200 can include a collection tank 202 and a microwave reactor 204. The collection tank 202 is used to house the liquid polyamine compound, the solid bis(cyclic carbonate), and the solid catalyst. The microwave reactor 204 includes a reaction chamber 206 and at least one magnetron 208. The bottom of the reaction chamber 206 has an inlet E1, and the top of the reaction chamber 206 has an outlet E2. The inlet E1 and the outlet E2 are respectively coupled to the collection tank 202 to form a circulating system. The microwave reactor 204 shown in FIG. 2 has 10 magnetrons 208, and the 10 magnetrons 208 are disposed on the sidewall of the reaction chamber 206. However, those having ordinary skill in the art can adjust the number or location of the magnetrons 208 based on process requirements, and the invention is not limited thereto. The liquid polyamine compound, solid bis(cyclic carbonate), and solid catalyst can be mixed in the collection tank 202 to form a heterogeneous mixture. Next, the heterogeneous mixture can be fed into the reaction chamber 206 via the inlet E1 and receive the microwave generated by at least one magnetron 208 in the reaction chamber 206 to be heated.

In some embodiments, the continuous reaction system 200 can further include a pump 210. The pump 210 is disposed between the collection tank 202 and the inlet E1 of the reaction chamber 206 to feed the heterogeneous mixture into the reaction chamber 206 from the bottom up. For instance, the pump 210 can be a gear pump, and a fluid can be circulated in a steady flow in the continuous reaction system 200. As a result, even if the heterogeneous mixture causes change in viscosity with a product formed in a partial reaction, the heterogeneous mixture can still be fed into the reaction chamber 206 in a steady flow by adjusting the rotating speed of the gear pump. Moreover, since the heterogeneous mixture is fed into the reaction chamber 206 from the bottom up, increase in the flow rate of the heterogeneous mixture in the reaction chamber 206 due to gravity can be prevented. In other words, the flow rate of the heterogeneous mixture in the reaction chamber 206 can be controlled simply by controlling the rotating speed of the pump 210. Therefore, the microwave amount received when the heterogeneous mixture passes through the reaction chamber 206 can be better controlled.

In some embodiments, the continuous reaction system 200 can further include a controller 212. The controller 212 is coupled to the at least one magnetron 208. For instance, the controller 212 can be a computer device. The controller 212 can control the switch and output power of each of the magnetrons 208 based on parameters such as the flow rate of the heterogeneous mixture, the density of the heterogeneous mixture, the temperature of the reaction chamber 206, and the predetermined reaction temperature. As a result, the reaction temperature of the heterogeneous mixture in the reaction chamber 206 can be dynamically adjusted. Moreover, the temperature distribution in the reaction chamber 206 can be more uniform. For instance, the reaction temperature of the heterogeneous mixture in the reaction chamber 206 can be controlled in the range of 100° C. to 150° C. In some embodiments, at least one temperature detector (not shown) can be disposed inside the reaction chamber 206 and/or at the inlet E1 and the outlet E2 of the reaction chamber 206 to obtain the temperature of each portion of the reaction chamber 206.

Step S106 is performed after step S104 to measure the reacted heterogeneous mixture by a Fourier transform infrared spectrometer to observe whether the infrared spectrum has the characteristic absorption peak of bis(cyclic carbonate). Therefore, whether the heterogeneous mixture is completely reacted into the polyurethane resin can be determined. For instance, referring to FIG. 3, whether the heterogeneous mixture is completely reacted into the polyurethane resin can be determined by the characteristic absorption peak at the wave number of 1802 $cm^{-1}$. In FIG. 3, the solid line represents the infrared spectrum of the bis(cyclic carbonate), and the dotted line represents the infrared spectrum of the completely reacted heterogeneous mixture. In the example shown in FIG. 3, the infrared spectrum of the completely reacted heterogeneous mixture does not show the characteristic absorption peak at the wave number of 1802 $cm^{-1}$, and therefore the heterogeneous mixture can be determined to be completely reacted.

If the characteristic absorption peak of bis(cyclic carbonate) is not observed in step S106, then step S108 is performed to remove the reaction product polyurethane resin. In some embodiments, only a single cycle is needed to completely react the heterogeneous mixture. In other words, the heterogeneous mixture can be completely reacted into the polyurethane resin by passing through the reaction chamber 206 only once. In the case of a single cycle, the reaction product polyurethane resin can be removed from the first release port P1 located between the outlet E2 of the reaction chamber 206 and the collection tank 202. In other embodiments, a plurality of cycles is needed to completely react the heterogeneous mixture into a polyurethane resin. In the case of a plurality of cycles, the reaction product polyurethane resin can be removed from the second release port P2 located between the pump 210 and the collection tank 202.

If the characteristic absorption peak of bis(cyclic carbonate) is observed in step S106, then step S110 is performed to repeat the step of heating the heterogeneous mixture in a microwave manner (step S104) until the characteristic absorption peak disappears, and then the step of removing the reaction product polyurethane resin (step S108) is performed. Specifically, if the characteristic absorption peak of bis(cyclic carbonate) is observed, then the heterogeneous mixture is circulated back into the reaction chamber 206 via the collection tank 202 to be reacted again, and the cycle is repeated until the characteristic absorption peak is not observed, and then the reaction product polyurethane resin is removed.

Based on the above, in an embodiment of the invention, the liquid polyamine compound, solid bis(cyclic carbonate), and solid catalyst are heated in a continuous reaction system in a microwave manner to prepare a polyurethane resin. Since microwave heating transfers energy in a radiation manner, heat loss caused by thermal convection can be prevented. As a result, the conversion rate of the reaction can be increased, and energy consumption needed to prepare the polyurethane resin can be reduced. Moreover, by preparing the polyurethane resin via a continuous reaction system, the yield of preparing polyurethane can be increased.

Next, the efficacy of the embodiments of the invention is described via experimental example 1, experimental example 2, and a comparative example.

Experimental Example 1

First, 4823.14 g of liquid polyether diamine was added in the collection tank 202. The frequency of the pump 210 (gear pump in the present experimental example) was adjusted to 60 Hz such that liquid polyether diamine was circulated at a flow rate of 4.8 L/min in the continuous reaction system 200. The switch and output power of each of the magnetrons 208 were adjusted by the controller 212 to control the temperature of the reaction chamber 206 in the range of 100° C. to 150° C. The total output power of all of the magnetrons 208 (10 magnetrons 208 in the present experimental example) was 1000 W to 3600 W. 686.69 g of solid pentacyclic carbonate was fed into the collection tank 202 at a rate of 4 g/min, and 6.96 g of solid lithium bromide was added in the collection tank 202 to stir and mix the solid pentacyclic carbonate, solid lithium bromide, and liquid polyether diamine to form a heterogeneous mixture. After the heterogeneous mixture was circulated for 12 hours, the heterogeneous mixture was measured by a Fourier transform infrared spectrometer to confirm that the heterogeneous mixture was completely reacted.

Experimental Example 2

The preparation method of the polyurethane resin of experimental example 2 is similar to the preparation method of the polyurethane resin of experimental example 1, and only the differences between the two are described below, and the same or similar portions are not repeated. In experimental example 2, 4000.00 g of liquid polyether diamine was first added in the collection tank 202. The frequency of the pump 210 (gear pump in the present experimental example) was adjusted to be 60 Hz to circulate the liquid polyether diamine in the continuous reaction system 200 at a flow rate of 4.8 L/min. Next, 770.00 g of solid pentacyclic carbonate was fed into the collection tank 202 at a rate of 2.13 g/min, and 7.80 g of lithium bromide was added in the collection tank 202. After the heterogeneous mixture was circulated for 1 hour, 2667.00 g of liquid polyether diamine was added. After the heterogeneous mixture was circulated for a total of 12 hours, the heterogeneous mixture was measured by a Fourier transform infrared spectrometer to confirm that the heterogeneous mixture was completely reacted.

Comparative Example

In the comparative example, the preparation of the polyurethane resin was performed using an oil bath pot. Specifically, 3.12 g of pentacyclic carbonate, 21.88 g of polyether diamine, and 0.32 g of lithium bromide were added in a three-necked bottle, and stirring was performed via a magnetic stirrer at a rotating speed of 360 rpm. The mixture in the three-necked bottle was heated and the temperature of the mixture was controlled at 130° C. to react the mixture and form a reaction product polyurethane resin. The mixture was measured with a Fourier transform infrared spectrometer to learn that the mixture was completely reacted after heating for 48 hours.

Results of Experimental Example 1, Experimental Example 2, and Comparative Example

TABLE 1

| | Pentacyclic carbonate (g) | Polyether diamine (g) | Lithium bromide (g) | Total weight of mixture (g) | Reaction temperature (° C.) | Reaction time (min) | Synthesis speed (g/hr) | Energy cost (NTD/kg) |
|---|---|---|---|---|---|---|---|---|
| Experimental example 1 | 686.69 | 4823.14 | 6.96 | 5516.79 | 100-150 | 720 | 459.7 | 5.6 |
| Experimental example 2 | 770.00 | 6666.67 | 7.80 | 7453.35 | 100-150 | 720 | 619.8 | 5.2 |
| Comparative example | 3.12 | 21.88 | 0.32 | 25.32 | 130 | 2880 | 0.5 | 2653 |

It can be known from the table that, under roughly the same reaction temperatures, the synthesis speeds of experimental example 1 and experimental example 2 are significantly higher than the synthesis speed of the comparative example. Therefore, by heating the mixture formed by the solid pentacyclic carbonate, solid lithium bromide, and liquid polyether diamine in the continuous reaction system in a microwave manner, energy can be more efficiently transferred to reactant molecules to increase the probability of collision and reaction among the reactant molecules. As a result, reaction conversion rate can be significantly increased, and energy consumption and cost of preparing the polyurethane resin can also be reduced.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A preparation method of a polyurethane resin, comprising:
   placing a liquid polyamine compound in a continuous reaction system and circulating the liquid polyamine compound in the continuous reaction system, wherein the continuous reaction system comprises:

a collection tank used to house the liquid polyamine compound, the solid bis(cyclic carbonate), and the solid catalyst; and a microwave reactor comprising a reaction chamber and at least one magnetron, wherein the reaction chamber has an inlet and an outlet, the inlet and the outlet are respectively coupled to the collection tank, and the heterogeneous mixture receives a microwave generated by the at least one magnetron in the reaction chamber to be heated;

placing a solid bis(cyclic carbonate) and a solid catalyst in the continuous reactor system to mix the solid bis(cyclic carbonate), the solid catalyst, and the liquid polyamine compound to form a heterogeneous mixture; and heating the heterogeneous mixture in the continuous reaction system in a microwave manner, such that the heterogeneous mixture reacts to form a polyurethane resin.

2. The preparation method of the polyurethane resin of claim 1, wherein the continuous reaction system further comprises a first release port located between the outlet of the reaction chamber and the collection tank to remove the polyurethane resin from the first release port.

3. The preparation method of the polyurethane resin of claim 1, wherein the continuous reaction system further comprises a controller, and the controller is coupled to the at least one magnetron to control a switch and an output power of each of the magnetrons.

4. The preparation method of the polyurethane resin of claim 1, wherein the continuous reaction system further comprises a pump, and the pump is disposed between the collection tank and the inlet of the reaction chamber to feed the heterogeneous mixture into the reaction chamber.

5. The preparation method of the polyurethane resin of claim 4, wherein the continuous reaction system further comprises a second release port located between the pump and the collection tank to remove the polyurethane resin from the second release port.

6. The preparation method of the polyurethane resin of claim 1, wherein the liquid polyamine compound comprises an aliphatic diamine compound, an aromatic diamine compound, a polysiloxane diamine compound, or a combination thereof.

7. The preparation method of the polyurethane resin of claim 1, wherein the solid bis(cyclic carbonate) comprises a bisphenol A-type pentacyclic carbonate resin, a soybean pentacyclic carbonate resin, or a combination thereof.

8. The preparation method of the polyurethane resin of claim 1, wherein the solid catalyst comprises a metal halide.

9. The preparation method of the polyurethane resin of claim 1, wherein a reaction temperature range of the heterogeneous mixture in the continuous reaction system is 100° C. to 150° C.

\* \* \* \* \*